US012315254B2

(12) United States Patent
Dou et al.

(10) Patent No.: US 12,315,254 B2
(45) Date of Patent: May 27, 2025

(54) IMAGE CONTENT CLASSIFICATION (71) Applicant: Intel Corporation, Santa Clara, CA (US)

(72) Inventors: Huan Dou, Beijing (CN); Lidong Xu, Beijing (CN); Xiaoxia Cai, Beijing (CN); Chen Wang, San Jose, CA (US); Yi-Jen Chiu, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 355 days.

(21) Appl. No.: 17/764,008

(22) PCT Filed: Dec. 24, 2019

(86) PCT No.: PCT/CN2019/127783
§ 371 (c)(1),
(2) Date: Mar. 25, 2022

(87) PCT Pub. No.: WO2021/127963
PCT Pub. Date: Jul. 1, 2021

(65) Prior Publication Data
US 2022/0351496 A1 Nov. 3, 2022

(51) Int. Cl.
*G06V 20/00* (2022.01)
*G06V 10/50* (2022.01)
(Continued)

(52) U.S. Cl.
CPC .............. *G06V 20/35* (2022.01); *G06V 10/50* (2022.01); *G06V 10/56* (2022.01); *G06V 10/762* (2022.01); *G06V 10/764* (2022.01); *G06V 20/62* (2022.01)

(58) Field of Classification Search
CPC ........ G06V 20/35; G06V 10/50; G06V 10/56; G06V 10/762; G06V 10/764; G06V 20/62; G06T 7/11; G06T 2207/20021; G06T 7/90
See application file for complete search history.

(56) References Cited

U.S. PATENT DOCUMENTS 10,871,884 B1 * 12/2020 Cole .................. G06V 10/56
11,158,060 B2 * 10/2021 Ellison ............... G06T 7/0002
(Continued)

FOREIGN PATENT DOCUMENTS

| CN | 109961015 A | 7/2019 | |
| WO | 03/010954 A1 | 2/2003 | |
| WO | WO-2014079036 A1 * | 5/2014 | ........... H04N 19/103 |

OTHER PUBLICATIONS

Wang et al., "SIMPLIcity: semantics-sensitive integrated matching for picture libraries," in IEEE Transactions on Pattern Analysis and Machine Intelligence, vol. 23, No. 9, pp. 947-963, Sep. 2001, doi: 10.1109/34.955109. (Year: 2001).*

(Continued)

*Primary Examiner* — Ming Y Hon
*Assistant Examiner* — Julia Z. Yao
(74) *Attorney, Agent, or Firm* — Hanley, Flight & Zimmerman, LLC (57) ABSTRACT

A method for image content classification is described herein. The method includes counting a number of distinct color numbers in an image. The method also includes clustering blocks with a same distinct color number into a same class and determining a block occupancy rate of each color number for the image. Finally, the method includes classifying the image according to the block occupancy rate via a plurality of classifiers communicatively coupled in series.

25 Claims, 7 Drawing Sheets

(51) Int. Cl.
*G06V 10/56* (2022.01)
*G06V 10/762* (2022.01)
*G06V 10/764* (2022.01)
*G06V 20/62* (2022.01)

(56) References Cited

U.S. PATENT DOCUMENTS

| | | | |
|---|---|---|---|
| 2010/0073393 A1* | 3/2010 | Saha | G06T 7/90 |
| | | | 345/589 |
| 2011/0002535 A1 | 1/2011 | Jia | |
| 2014/0126809 A1* | 5/2014 | Matsumura | G06Q 30/02 |
| | | | 382/162 |
| 2014/0192372 A1 | 7/2014 | Kang | |
| 2016/0275374 A1* | 9/2016 | Zhu | G06V 10/764 |
| 2021/0044862 A1* | 2/2021 | Lee | H04N 21/485 |

OTHER PUBLICATIONS

M. Islam et al., "Automatic Categorization of Image Regions Using Dominant Color Based Vector Quantization," 2008 Digital Image Computing: Techniques and Applications, Canberra, ACT, Australia, 2008, pp. 191-198, doi: 10.1109/DICTA.2008.17. (Year: 2008).*
Vailaya et al., "Image classification for content-based indexing," in IEEE Transactions on Image Processing, vol. 10, No. 1, pp. 117-130, Jan. 2001, doi: 10.1109/83.892448. (Year: 2001).*
Athitsos et al., "Distinguishing photographs and graphics on the World Wide Web," 1997 Proceedings IEEE Workshop on Content-Based Access of Image and Video Libraries, St. Thomas, VI, USA, 1997, pp. 10-17, doi: 10.1109/IVL.1997.629715. (Year: 1997).*
Lienhart et al., "Classifying images on the web automatically," J. Electron. Imag. 11(4) (Oct. 1, 2002) https://doi.org/10.1117/1.1502259 (Year: 2002).*
Pourashraf et al., "Genre-based image classification using ensemble learning for online flyers," Proc. SPIE 9631, Seventh International Conference on Digital Image Processing (ICDIP 2015), 96310Z (Jul. 6, 2015); https://doi.org/10.1117/12.2197138 (Year: 2015).*
Liu et al., "Fast Genre Classification of Web Images Using Global and Local Features," 2017 4th IAPR Asian Conference on Pattern Recognition (ACPR), Nanjing, China, 2017, pp. 834-839, doi: 10.1109/ACPR.2017.84. (Year: 2017).*
Sikora, "The MPEG-7 visual standard for content description-an overview," in IEEE Transactions on Circuits and Systems for Video Technology, vol. 11, No. 6, pp. 696-702, Jun. 2001, doi: 10.1109/76.927422. (Year: 2001).*
Shen et al., "Classification-Based Adaptive Compression Method for Computer Screen Image," 2012 IEEE International Conference on Multimedia and Expo Workshops, Melbourne, VIC, Australia, 2012, pp. 7-12, doi: 10.1109/ICMEW.2012.9. (Year: 2012).*
International Searching Authority, "International Preliminary Report on Patentability," issued in connection with International Patent Application No. PCT/CN2019/127783, mailed on Jul. 7, 2022, 6 pages.
Intellectual Property of Office of India, "Examination Report," issued in connection with Indian Patent Application No. 202247015279, dated Feb. 21, 2023, 6 Pages.
International Searching Authority, "International Search Report," mailed in connection with International Patent Application No. PCT/CN2019/127783, on Sep. 30, 2020, 4 pages.
International Searching Authority, "Written Opinion," mailed in connection with International Patent Application No. PCT/CN2019/127783, on Sep. 30, 2020, 4 pages.

* cited by examiner

IMAGE CONTENT CLASSIFICATION

RELATED APPLICATION(S)

This patent arises from the national stage of International Patent Application No. PCT/CN2019/127783, which is titled "IMAGE CONTENT CLASSIFICATION," and which was filed on Dec. 24, 2019. Priority to International Patent Application No. PCT/CN2019/127783 is claimed. International Patent Application No. PCT/CN2019/127783 is hereby incorporated herein by reference in its entirety.

BACKGROUND ART

Generally, artificial intelligence includes machine learning and deep learning. Each of machine learning and deep learning rely on training data from a training dataset. Training data is data that is used to teach or train algorithms underlying machine learning or deep learning how to perform a particular task. Depending on the implementation, training data may have various properties. For example, training data may be labeled or unlabeled. While the training data consists of various patterns or relationships useful in training machine learning or deep learning algorithms to perform a certain task, training data may also include other patterns relationships that are irrelevant to the particular training of the machine learning or deep learning.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, each of machine learning and deep learning algorithms are trained to perform various tasks using training data. As a result, the accuracy or quality of a machine learning or deep learning based-model relies on the content coverage of training data. As used herein, a coverage of training data refers to an extent to which content of the training dataset illustrates a particular relationship defined by a task to be performed by the machine learning or the learning model. For example, machine/deep learning-based models may be used in many computer vision and image/video processing tasks, such as image super-resolution and denoising. In the example of computer vision tasks, training data may be composed of millions of images. However, images have different features based on the category of the image, such as natural, gaming, or text content. For example, features of a text image are much different from features found in a natural image. Mixing different kinds of image content into one training dataset may lead to an increased difficulty for computer vision tasks as well as a mediocre machine/deep learning model. Moreover, a text denoising task may be more accurate by using a training data set with content that illustrates various textual relationships.

The present techniques enable image content classification. In particular, image content may be sorted into different categories such that the machine/deep learning network can easily summarize consistent image features from each category of images during a training stage. At an inference stage, the processing of the input image can achieve more accurate results using the corresponding category's machine learning/deep learning model. For ease of description, the present techniques are described without using machine learning or deep learning. However, the present techniques may be used with any artificial intelligence approach that is trained using a data set.

Accordingly, the present techniques enable a content-aware approach to detect sets of features within an image. To make full use of both the local and the global features of an image, the present techniques include counting color numbers in a block-based manner for an image, and those blocks with the same color number in the whole image are clustered into one class. As used herein, a local feature refers to a color number of each specified block. A global feature refers to image-level statistics of the blocks with the same local feature (i.e., color number). A block occupancy rate of a certain color number in the image or the cumulative occupancy rate of successive color numbers in the image is directly utilized to classify the input image into one type of image category.

Accordingly, the present techniques can classify image content without the use of machine/deep learning techniques during classification. Moreover, a smaller, more accurate dataset can be derived to train machine/deep learning-based models. Furthermore, the present techniques can be used to classify videos in real-time. The present techniques are not limited to binary classification, and can classify multi-class content in real time. Additionally, the present techniques do not require the use a of source image for classification.

Figure 1:
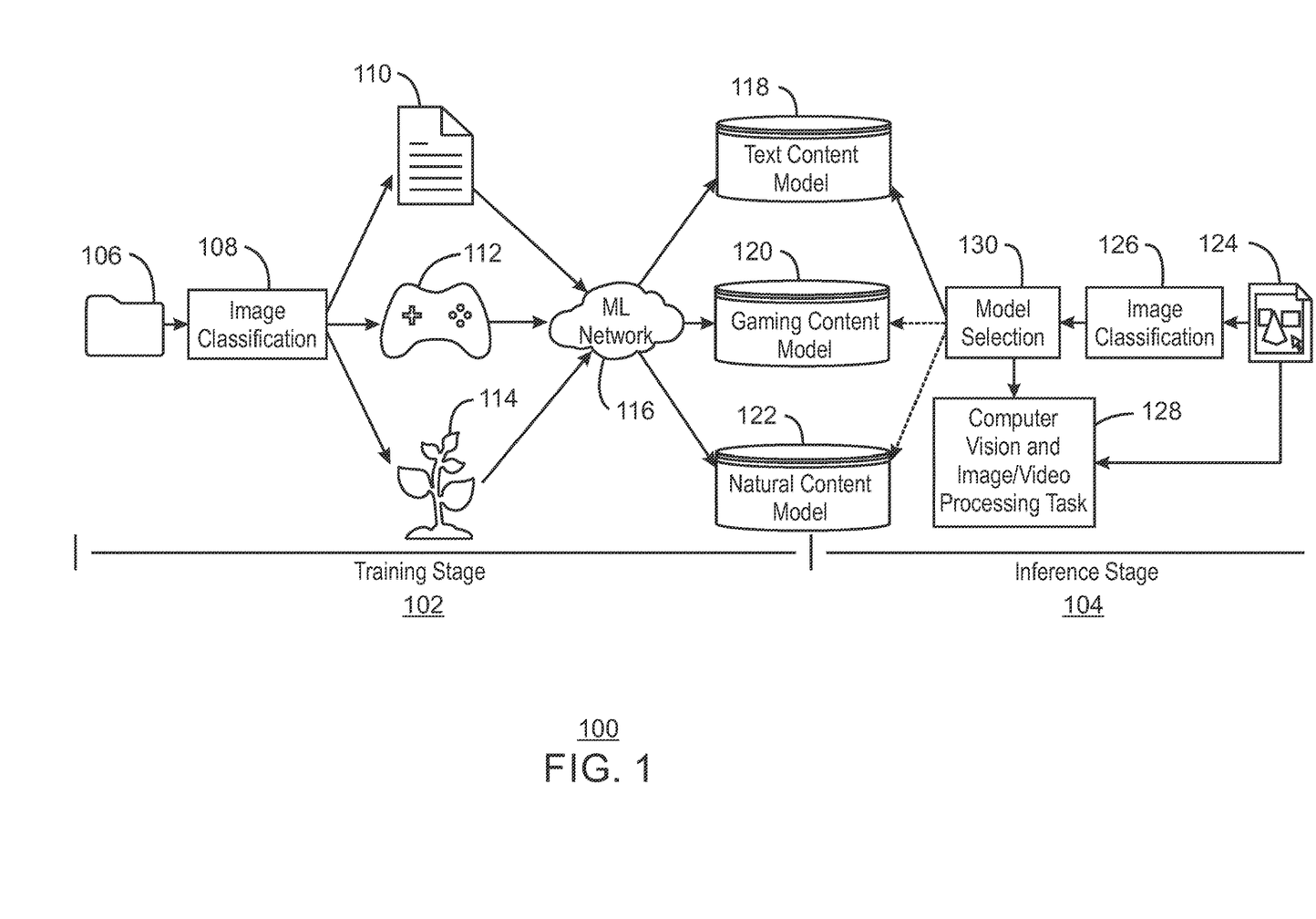
FIG. 1 is a block diagram of a machine learning or deep learning system.

FIG. 1 is a block diagram of a machine learning or deep learning system 100. In the system 100 of FIG. 1, a training stage 102 and an inference stage 104 are illustrated. At the training stage 102, the model learns from the data. Accordingly, a training data set 106 is input into image classification 102. Image classification 108 may be performed as described by the image classification 200 in FIG. 2. As illustrated, image classification 108 may sort images from the training data set 106 into multiple classes of content. The multiple classes include text content 110, gaming content 112, and natural content 114. Each image of the training data set 106 is classified into one of the multiple classes of content.

The multiple classes of content may be used to train multiple classes of models 118-122 using a machine learning or deep learning network 116. A text content model 118 is trained by the machine learning network 116 using the text content dataset 110, a gaming content model 120 is trained by the machine learning network 116 using the gaming content dataset 112, and a natural content model 122 is trained by the machine learning network 116 using natural content 114. During the training stage, the present techniques partition the training dataset into multiple categories of content. By using a training dataset partitioned into multiple categories of content, each content model is more accurate when compared to models trained without partitioned datasets.

For ease of illustration, a machine learning network (ML) 116 is illustrated. However, training may be applied to any artificial intelligence-based network as described herein, such as a deep learning network. The training according to the present techniques results in multiple machine/deep learning-based models. In embodiments, these models are used for computer vision tasks. As illustrated, the derived models include a text content model 118, a gaming content model 120, and a natural content model 122. From the inference phase 104, each of the models 118-122 can be used to perform computer vision and image/video processing tasks 128, such as image super-resolution and denoising, for the input image 124 according to the image classification. Accordingly, the input image 124 may be input into image classification 126. Image classification 126 may be performed as described by the image classification 200 in FIG. 2. As illustrated, image classification 126 may classify the input image into a particular class of content. Depending on the results of the image classification 126, a content model is selected at model selection 130. A text content model 118, gaming content model 120, or natural content model 122 is selected according to the particular classification of the input image 124.

As an example, the machine learning network 116 may be a deep learning network designed for denoising. In this example, the text content model 118, gaming content model 120, and natural content model 122 may be trained as a text content denoising model 118, gaming content denoising model 120, and natural content denoising model 122, respectively. The input dataset 106 is classified (image classification 108) according to the present techniques to train the plurality of denoising content models. Once trained, the denoising content models may be applied to the input image 124 for denoising. The input image 124 may be classified (image classification 126) so that the appropriate content model is used to denoise the input image 124, based on the content of the input image. Thus, a text image uses a text content model for denoising, a gaming image uses a gaming content model for denoising, and a natural image uses a natural content model for denoising.

As illustrated, the present techniques enable an image content classification technique that is operable with computer vision related machine learning/deep learning systems as shown in FIG. 1. The present techniques eliminate mixed categories of training images content in a single dataset. Thus, the present techniques enable more accurate, higher quality computer vision models. Furthermore, the present techniques prevent the computer vision problem becoming difficult and the machine learning model becoming mediocre.

The block diagram of FIG. 1 is not intended to indicate that the system 100 is to include all of the components shown in FIG. 1. Rather, the computing system 100 can include fewer or additional components not illustrated in FIG. 1 (e.g., additional classes, additional models, etc.). The system 100 may include any number of additional components not shown in FIG. 1, depending on the details of the specific implementation. Furthermore, any of the functionalities described in relation to the FIG. 100 may be partially, or entirely, implemented in hardware and/or in a processor. For example, the functionality may be implemented with an application specific integrated circuit, in logic implemented in a processor, in logic implemented in a specialized graphics processing unit, or in any other device.

As illustrated in FIG. 1, image classification may be used in each of the training stage 102 and inference stage 104 of the system 100. A block occupancy rate may be defined in terms of color number of an input image and used to classify the image into a text content category, a gaming content category or a natural content category. As used herein, a color number may be a numerical representation of color. For example, the color number may be a hexagonal triplet (hex triplet) where color is represented by a bite of information. The hex triplet may be generated by concatenating the three bites of information. In some cases, the hex triplet may be represented in decimal notation. In decimal notation, the hex triplet can range from 0 to 255. Thus, each distinct color number may be a hexadecimal triplet that specifies a color. While the present techniques describe numerical color representations, any color representation can be used according to the techniques described herein.

In embodiments, the block occupancy rate in terms of color number is represented by computing the percentage of blocks with a certain color number or by computing the cumulated percentage of blocks with successive color numbers according to the classification category so that the multi-class classification problem can be solved. The proposed solution does not need additional training process or training data so that the proposed solution is easy to be implemented and is capable to be integrated into a real-time video-based application.

Figure 2:
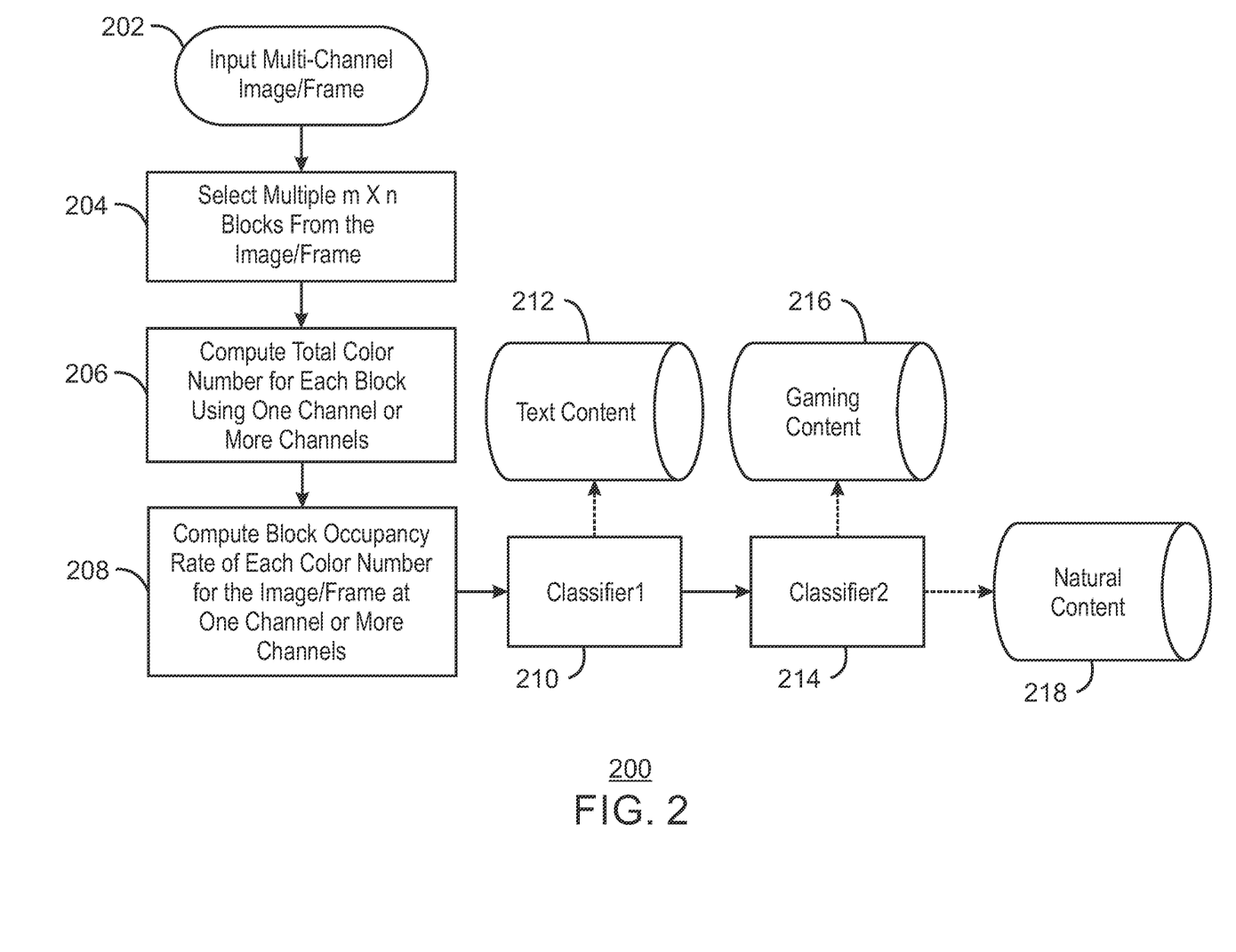
FIG. 2 is a process flow diagram of a method for image content classification.

FIG. 2 is a process flow diagram of a method 200 for image content classification. At block 202, a multichannel image/frame input is obtained. In the example illustrated by FIG. 1, input into image classification during the training phase 102 includes a plurality of images from a training data set. Input image classification 126 of FIG. 1 (during the inference phase 104) includes a single input image to be classified and ultimately recognized by the selected model.

At block 204, for the input multi-channel image or video obtained at block 202, multiple m×n blocks are selected from the image or from one frame of the video. In one embodiment, the input image/frame could be evenly divided into non-overlapped, distinct m×n blocks of pixels. The values of m and n may be selected to enable real time processing of each block. In embodiments, the values of m and n may vary according to the particular classifier. For example, a first classifier that classifies images into text and non-text content may use smaller m×n blocks of pixels to determine a block occupancy rate when compared with a second classifier that classifies images into gaming and natural content. Additionally, the block occupancy rate is calculated using sub-blocks of an image to ensure that local features and details of the image are considered during classification. Traditionally, an image-based classification fails to include local features and details of an image when classifying the content of the image.

At block 206, for each m×n block, the total color number is counted for one channel or more channels. For example, for an input video frame in YUV format, the total color numbers for each m×n block can be counted for only the Y channel or for all YUV channels. Color number is selected according to the present techniques, as the color number a block represents the level of the block's texture complexity. As described herein, the color number is a relatively stable feature and will not drastically change compared to the texture pattern. Therefore, blocks with different color numbers can be regarded as different classes.

At block 208, for the whole image or frame, the block occupancy rate for blocks with the same color number is computed. In other words, blocks within the image/frame are clustered into different classes according to the block color number, and the block percentage of each class in the image/frame presents the block occupancy rate in terms of color number. By calculating the block occupancy rates for certain color numbers within the certain image or frame, the local features extracted by block-based operation can be converted into global features of the whole image or frame. In addition, the occupancy rate is relatively stable because there is no need to consider the different resolution of the input images. In this manner, the present techniques can both consider the detail and the global feature of a certain image or frame.

Thus, an image may be partitioned into blocks to derive the local feature information for each block. The global features are derived by calculating the statistics (rates/percentages) for the entire image. In embodiments, the global features are used for image categorization. Generally, color number varies widely among blocks from different categories of images. In turn, the block occupancy rate in terms of color numbers in an input image or frame can be used to distinguish the image's or frame's category. Based on the block occupancy rate in terms of color number, the present techniques use a plurality of classifiers 210 and 214 to classify the image category. As illustrated, the plurality of classifiers is communicatively coupled in series, where the output of a first classifier immediately serves as input to a second classifier. In the present techniques, the block occupancy rate in terms of color number is taken as a content feature and can be represented by calculating the percentage of blocks with a certain color number. In addition, if more than one channel is used to count the color number, then the block occupancy rate is computed for each channel. For example, the block occupancy rate of a certain color number for 8-bit Y channel can be computed as in Eq. 1:

$$P(c) = \frac{\#\{M_{block} = c\}}{N} \times 100\%, 1 \le c \le \min(m \times n, 256) \quad (1)$$

Where N is the total number of m×n blocks in the input image or frame, # is the block number of a set denoted by {·}, and $M_{block}$ is the color number in Y channel counted for a m×n block. Because the block size is m×n and the color value in 8-bit Y channel ranges from 0 to 255, the possible color number c of a m×n block ranges from 1 to the smaller value between m×n and 256. Then P(c) can represent the block occupancy rate in terms of a certain color number within the image or frame.

Thus, a first classifier 210 takes as input the block occupancy rate as derived at block 208. Depending on the block occupancy rate as described with respect to FIG. 3, it is determined if the block occupancy rate indicates that the content is text content. If the block occupancy rate indicates that the content of the current image or video is text content, the input image or video is classified as text content 212. If the block occupancy rate does not indicate that the contents of the current image or video is text content, the block occupancy rate is sent to a second classifier 214. If the block occupancy rate indicates that the content of the current image or video is gaming content, the input image or video is classified as gaming content 214. If the block occupancy rate does not indicate that the contents of the current image or video is gaining content, the content is classified as natural content 218.

Figure 3:
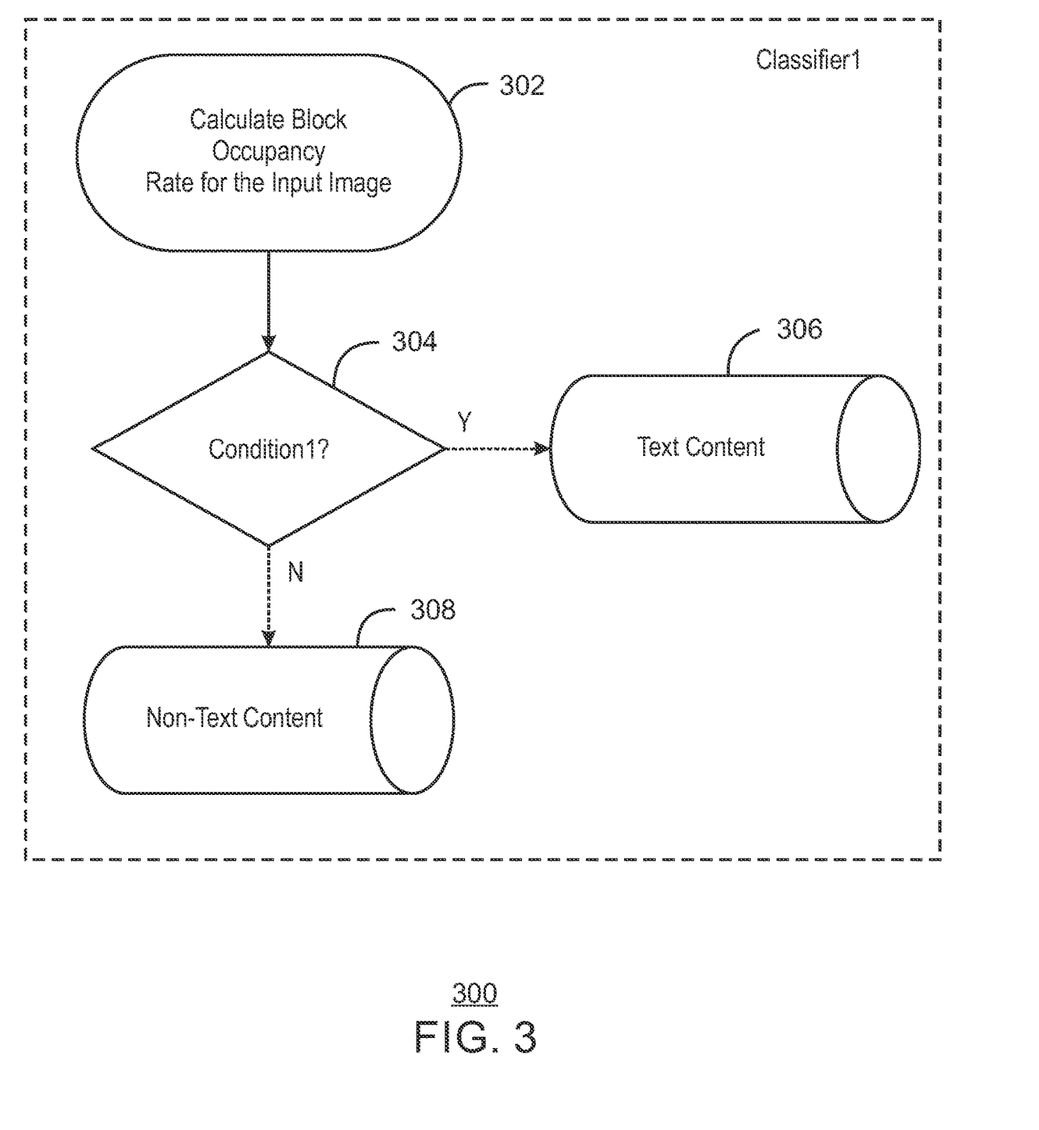
FIG. 3 is a block diagram of a first classifier.

FIG. 3 is a block diagram of a first classifier 210. The first classifier 210 of FIG. 3 may correspond to the first classifier 210 of FIG. 2. Accordingly, the first classifier 210 is used to determine if the input images or video are considered text content. Text content has very unique characteristics from other image content. Specifically, text content is more likely to be filled with a large area of pure color background, such as black characters on a white background. In embodiments, the block occupancy rate may be used to determine global features, such as the large areas of pure color indicative of text content. Hence, the first classifier 210 is applied first to identify the text content as shown in FIG. 3.

Accordingly, at block 302 the block occupancy rates for an input image is calculated. While block 302 describes a calculation of the block occupancy rate, the block occupancy rate need not be calculated by the first classifier. At block 304, if the block occupancy rate in terms of color number satisfies a first condition, then this image is classified into text content, otherwise into non-text content. The first condition is a first threshold as described by Eqn. 2 below.

$$P(t) \ge Th1, 1 \le t \le \min(m \times n, 256) \quad (2)$$

In particular, t denotes a pre-defined color number for a m×n block and Th1 denotes a threshold used to pick out the text content images. Thus, the first condition is met if the input image or frame has more than Th1 percent of m×n blocks which all have the same color number equals to t in this image or frame. If this condition is satisfied, then this image or frame can be classified as a text content as illustrated at block 306. In embodiments, if more than one channel is used to compute the block occupancy rate in terms of color number, the block occupancy rate in terms of color number of all channels to all satisfy the first condition. However, the particular threshold Th1 applied to each color channel can be varied among different channels. If the first condition 304 is not satisfied, the image or frame is classified as non-text content 308. The non-text content is subject to additional classification as described in FIG. 1.

Figure 4:
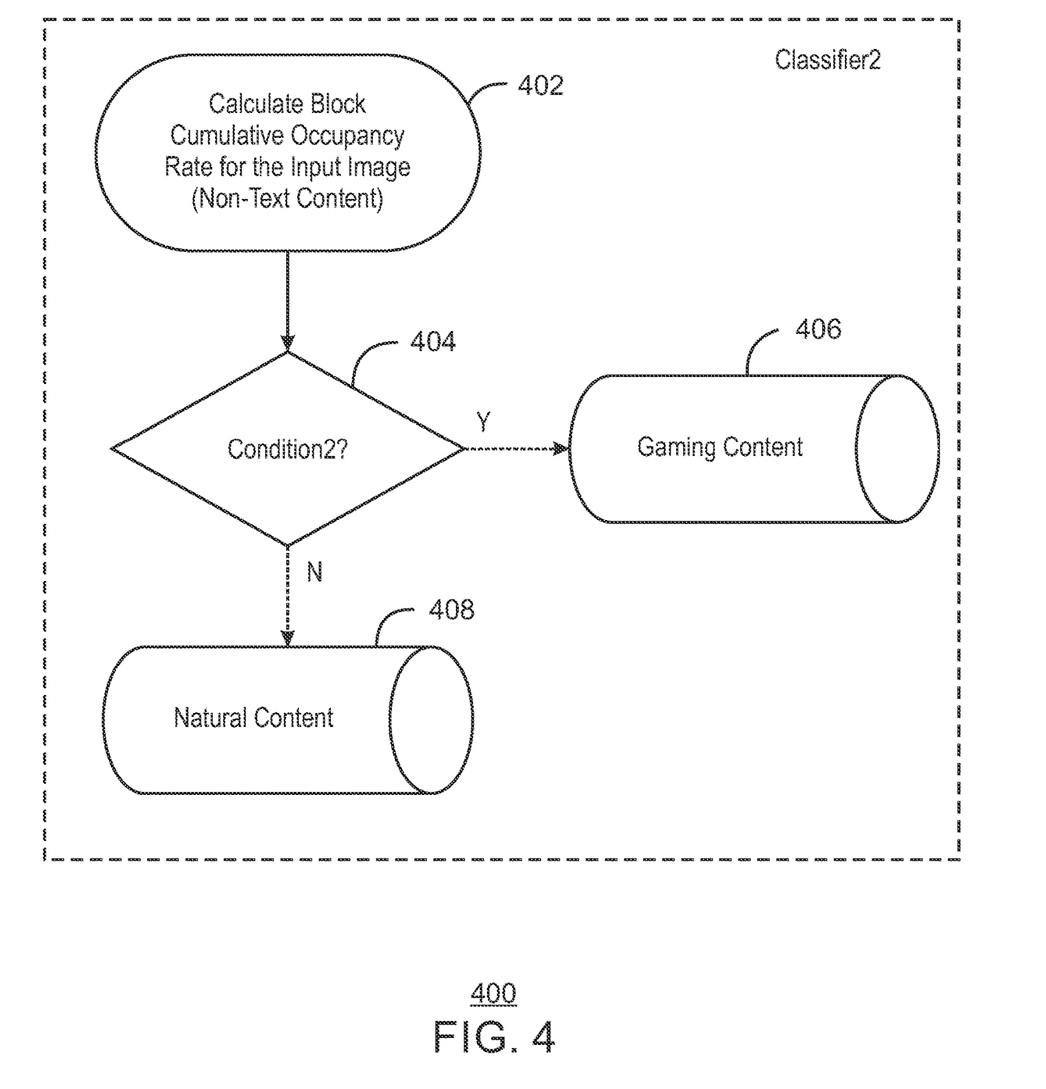
FIG. 4 is a block diagram of a second classifier.

FIG. 4 is a block diagram of a second classifier 214. The second classifier 214 of FIG. 4 may correspond to the second classifier 214 of FIG. 2. Accordingly, the second classifier 214 is used to determine if the remaining non-text content images or video are considered gaming content or natural content. For the remaining non-text content images, the second classifier is applied to separate the gaming content and the natural content as shown in FIG. 4. Thus, in response to a first classifier classifying content as non-text content, a block cumulative occupancy rate is computed for the image and used by subsequent classifiers in the series of classifiers to classify content of the image. In embodiments, observations can be made regarding the content. In particular, gaming content is one kind of the computer generated (CG) graphics. Compared with gaming content, natural content contains more colors. Besides, at the texture area, gaming content is much smoother than natural content. As used herein, natural content may refer to content that is not computer generated content or text content.

Based on these observations, if an image's block cumulative occupancy rate of successive color numbers satisfies the second condition in Eqn. 3, this image can be classified into the gaming content, otherwise it is classified as natural content.

$$\text{cdf}(r) \ge Th2 \quad (3)$$

In the second condition, the block cumulative occupancy rate of successive color numbers is represented by the block-based Cumulative Distribution Function (CDF) which is computed as in (4).

$$\text{cdf}(r) = \Sigma_{i=1}^{r} P(i) \quad (4)$$

The block-based CDF describes the block cumulative occupancy rates of color numbers in a pre-defined range.

The CDF represents an accumulated probability of a range of color numbers in the entire image. For a specified range of color numbers, the CDF of a gaming image is different from that of natural image. Generally, natural content contains many more color numbers per image than text or gaming content. Moreover, the blocks of a text image have substantially fewer colors than the blocks of a natural image. Thus, an assumption can be made that assume that each block in a natural image contains more colors when compared to each block in a gaming image.

When a reasonable range (i.e., the value of r) is specified, the cdf(r) of a gaming image is much higher than the cdf(r) of a natural image. Since cdf(r) calculates the sum of P(1) to P(r), if r is set to a small value, the cdf(r) of the gaming image is more likely to be larger than the cdf(r) of the natural image because color numbers of most blocks in the gaming image are smaller than those of the natural image. In Eqn. 3, the Th2 denotes a threshold used to select/classify the gaming content images, and r is a pre-defined color number ceiling to define the successive color number range. Thus, second condition means if the input image or frame has more than Th2 percent of m×n blocks which have color numbers all in the range of 1 to r, then this image or frame is considered to be gaming content. If more than one channel is used to compute the block cumulative occupancy rate, the block cumulative occupancy rate in each channel needs to all satisfy the second condition, and the Th2 can be varied among different channels. In this manner, the second classifier classifies content as gaming content or natural content based on a cumulative distribution function. As a result, the present techniques do not require additional training process or training data to classify content.

Figure 5:
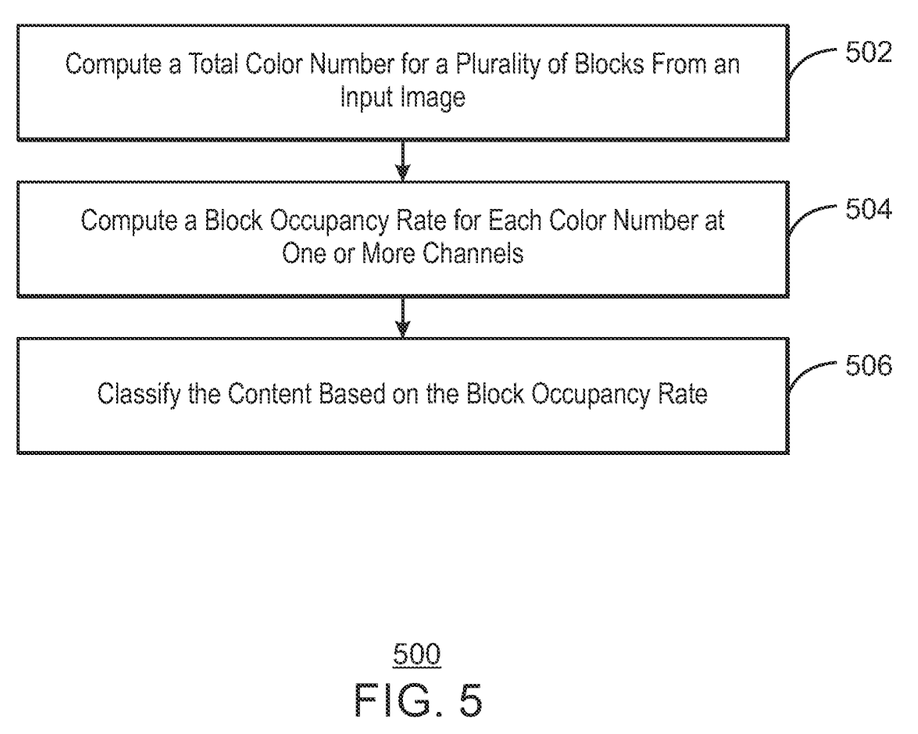
FIG. 5 is a process flow diagram of a method for image content classification.

FIG. 5 is a process flow diagram of a method 500 for image content classification. At block 502, a total color number is computed for a plurality of blocks from an input image. At block 504, a block occupancy rate is computed for each color number at one or more channels. In embodiments, if the color number is computed for more than one channel, then the color number is computed for all channels. At block 506, the content is classified based on the block occupancy rate.

This process flow diagram is not intended to indicate that the blocks of the example method 400 are to be executed in any particular order, or that all of the blocks are to be included in every case. Further, any number of additional blocks not shown may be included within the example method 500, depending on the details of the specific implementation.

Figure 6:
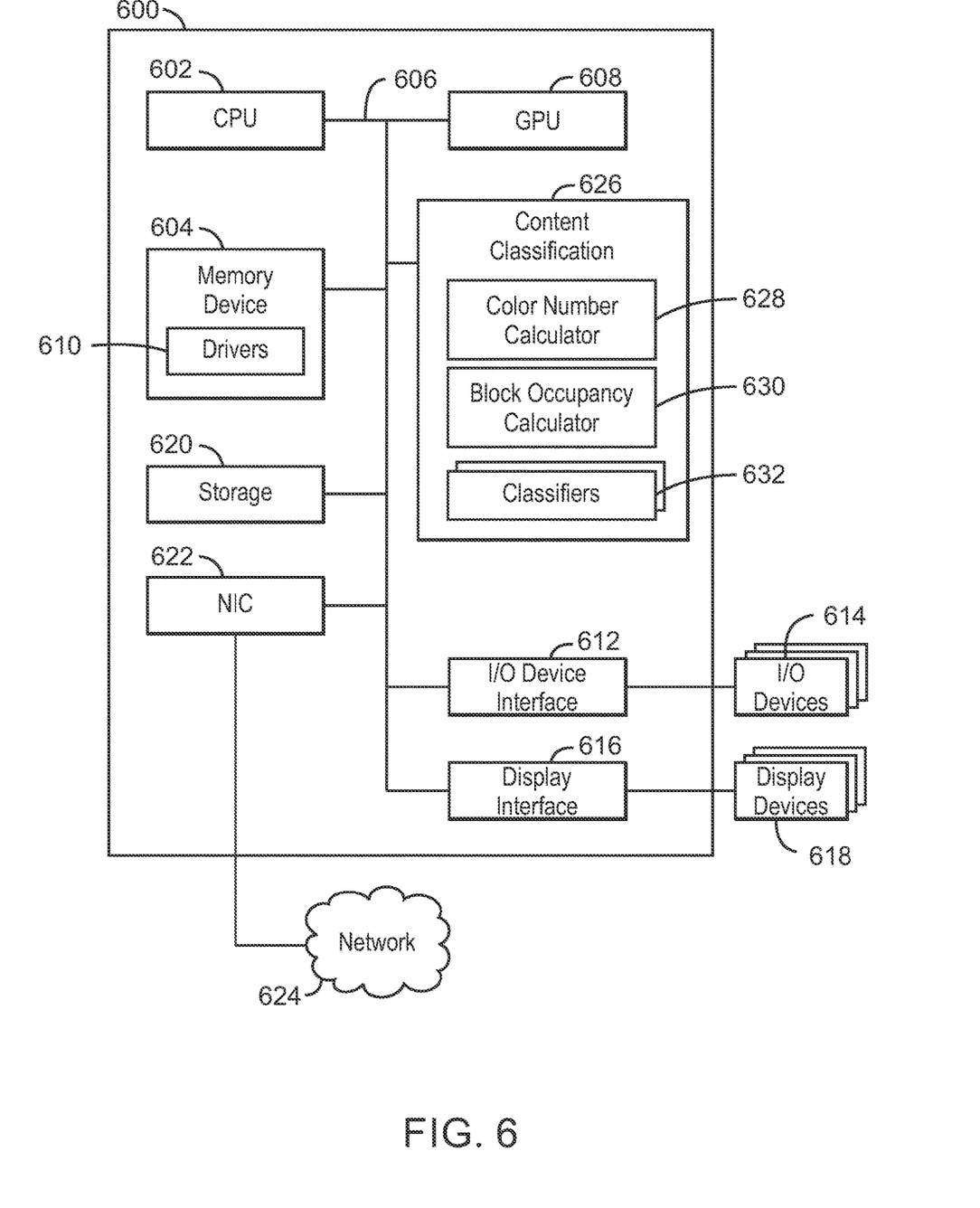
FIG. 6 is a block diagram illustrating an example computing device that enables image content classification.

Referring now to FIG. 6, a block diagram is shown illustrating an example computing device 600 that enables image content classification. The computing device 600 may be, for example, a laptop computer, desktop computer, tablet computer, mobile device, or wearable device, among others. In some examples, the computing device 600 may be a streaming video capture device, such as a security camera or other camera. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random-access memory (DRAM).

The memory device 604 can include random access memory (RAM), read only memory (ROM), flash memory, or any other suitable memory systems. For example, the memory device 604 may include dynamic random-access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for image content classification. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combinations thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a content classification manager 626. For example, the content classification manager 626 can be used classify image content from a training dataset. The content classification manager may also classify an input image to a trained model. The content classification manager 626 can include a color number calculator 628, a block occupancy calculator 630, and a plurality of classifiers 632. In some examples, each of the components 628-632 of the content classification manager 626 may be a microcontroller, embedded processor, or software module. The color number calculator 628 can compute a total color number of a plurality of blocks from an image of a training dataset or an input image. The block occupancy calculator 630 can compute a block occupancy rate for each color number at one or more channels. The plurality of classifiers 632 can classify the content of the training dataset or input image based on the block occupancy rate. For example, the plurality of classifiers may be communicatively coupled in series. Each classifier may apply a respective threshold that represents a condition to the obtained block occupancy rate. If the block occupancy rate satisfies the threshold, the particular image is classified as having content associated with the particular classifier. If the threshold is not satisfied, the block occupancy rate in sent to the next classifier in the series of classifiers until the image is classified.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. Furthermore, any of the functionalities of the color number calculator 628, the block occupancy calculator 630, and the plurality of classifiers 632, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the content classification manager 626 may be implemented with an application specific integrated circuit, in logic implemented in a processor, in logic implemented in a specialized graphics processing unit such as the GPU 608, or in any other device.

Figure 7:
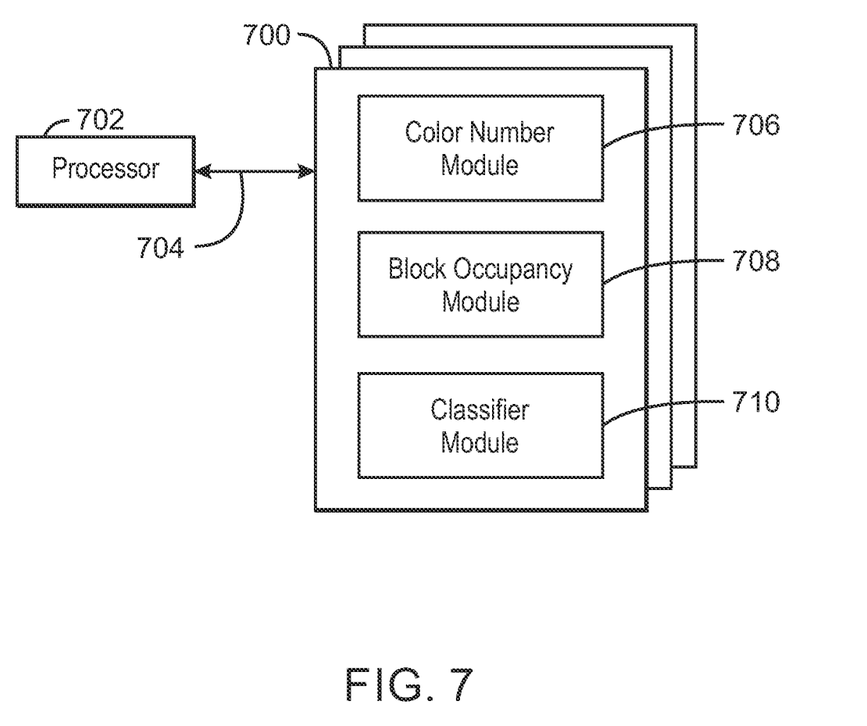
FIG. 7 is a block diagram showing a medium that contains logic for image content classification.

FIG. 7 is a block diagram showing a medium 700 that contains logic for image content classification. The medium 700 may be a computer-readable medium, including a non-transitory medium that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706-710 configured to perform the techniques described herein. For example, a color number module 706 may be configured to compute a total color number of a plurality of blocks from an image of a training dataset or an input image. A block occupancy module 708 may be configured to compute a block occupancy rate for each color number at one or more channels. A classifier module 710 may be configured to execute or generate a plurality of classifiers that can classify the content of the training dataset or input image based on the block occupancy rate.

The block diagram of FIG. 7 is not intended to indicate that the medium 700 is to include all of the components shown in FIG. 7. Further, the medium 700 may include any number of additional components not shown in FIG. 7, depending on the details of the specific implementation.

EXAMPLES

Example 1 is a method for image content classification. The method includes counting a number of distinct color numbers in an image; clustering blocks with a same distinct color number into a same class; determining a block occupancy rate of each color number for the image; and classifying the image according to the block occupancy rate via a plurality of classifiers communicatively coupled in series.

Example 2 includes the method of example 1, including or excluding optional features. In this example, the block occupancy rate is the number of blocks with a distinct color number divided by a total number of blocks in the image.

Example 3 includes the method of any one of examples 1 to 2, including or excluding optional features. In this example, local features are extracted by determining the color numbers for a plurality of blocks in the image, and the local features are converted to global features.

Example 4 includes the method of any one of examples 1 to 3, including or excluding optional features. In this example, the method includes extracting local features by determining the color numbers for a plurality of blocks in the image; converting the local features are converted to global features; and classifying the image classifying the image according to the block occupancy rate and the global features.

Example 5 includes the method of any one of examples 1 to 4, including or excluding optional features. In this example, a first classifier classifies content as text content or non-text content.

Example 6 includes the method of any one of examples 1 to 5, including or excluding optional features. In this example, in response to a first classifier classifying content as non-text content, a block cumulative occupancy rate is computed for the image and used by subsequent classifiers in the series of classifiers to classify content of the image.

Example 7 includes the method of any one of examples 1 to 6, including or excluding optional features. In this example, a second classifier classifies content as gaming content or natural content based on a cumulative distribution function.

Example 8 includes the method of any one of examples 1 to 7, including or excluding optional features. In this example, each distinct color number is a hexadecimal triplet that specifies a color.

Example 9 includes the method of any one of examples 1 to 8, including or excluding optional features. In this example, the image is divided into a plurality of blocks, and a distinct color number is computed for each block of the image.

Example 10 is an apparatus for image content classification. The apparatus includes a color number calculator to count a number of distinct color numbers in an image and cluster blocks with a same distinct color number into a same class; a block occupancy calculator to determine a block occupancy rate of each color number for the image; and a plurality of classifiers communicatively coupled in series to classify the image according to the block occupancy rate.

Example 11 includes the apparatus of example 10, including or excluding optional features. In this example, the block occupancy rate is the number of blocks with a distinct color number divided by a total number of blocks in the image.

Example 12 includes the apparatus of any one of examples 10 to 11, including or excluding optional features. In this example, local features are extracted by determining the color numbers for a plurality of blocks in the image, and the local features are converted to global features.

Example 13 includes the apparatus of any one of examples 10 to 12, including or excluding optional features. In this example, the apparatus includes extracting local features by determining the color numbers for a plurality of blocks in the image; converting the local features are converted to global features; and classifying the image classifying the image according to the block occupancy rate and the global features.

Example 14 includes the apparatus of any one of examples 10 to 13, including or excluding optional features. In this example, a first classifier classifies content as text content or non-text content.

Example 15 includes the apparatus of any one of examples 10 to 14, including or excluding optional features. In this example, in response to a first classifier classifying content as non-text content, a block cumulative occupancy rate is computed for the image and used by subsequent classifiers in the series of classifiers to classify content of the image.

Example 16 includes the apparatus of any one of examples 10 to 15, including or excluding optional features. In this example, a second classifier classifies content as gaming content or natural content based on a cumulative distribution function.

Example 17 includes the apparatus of any one of examples 10 to 16, including or excluding optional features. In this example, each distinct color number is a hexadecimal triplet that specifies a color.

Example 18 includes the apparatus of any one of examples 10 to 17, including or excluding optional features. In this example, the image is divided into a plurality of blocks, and a distinct color number is computed for each block of the image.

Example 19 is at least one computer readable medium for image content classification having instructions stored therein that. The computer-readable medium includes instructions that direct the processor to count a number of distinct color numbers in an image; cluster blocks with a same distinct color number into a same class; determine a block occupancy rate of each color number for the image; and classify the image according to the block occupancy rate via a plurality of classifiers communicatively coupled in series.

Example 20 includes the computer-readable medium of example 19, including or excluding optional features. In this example, the block occupancy rate is the number of blocks with a distinct color number divided by a total number of blocks in the image.

Example 21 includes the computer-readable medium of any one of examples 19 to 20, including or excluding optional features. In this example, local features are extracted by determining the color numbers for a plurality of blocks in the image, and the local features are converted to global features.

Example 22 includes the computer-readable medium of any one of examples 19 to 21, including or excluding optional features. In this example, the computer-readable medium includes extracting local features by determining the color numbers for a plurality of blocks in the image; converting the local features are converted to global features; and classifying the image classifying the image according to the block occupancy rate and the global features.

Example 23 includes the computer-readable medium of any one of examples 19 to 22, including or excluding optional features. In this example, a first classifier classifies content as text content or non-text content.

Example 24 includes the computer-readable medium of any one of examples 19 to 23, including or excluding optional features. In this example, in response to a first classifier classifying content as non-text content, a block cumulative occupancy rate is computed for the image and used by subsequent classifiers in the series of classifiers to classify content of the image.

Example 25 includes the computer-readable medium of any one of examples 19 to 24, including or excluding optional features. In this example, a second classifier classifies content as gaming content or natural content based on a cumulative distribution function.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for image content classification, the method comprising:
    counting distinct color numbers in blocks of an image to determine respective total color number counts associated with corresponding ones of the blocks;
    determining respective block occupancy rates for corresponding ones of the total color number counts, the respective block occupancy rates based on respective quantities of the blocks of the image having the corresponding total color number counts; and
    classifying the image according to the block occupancy rates via a plurality of classifiers.

2. The method of claim 1, wherein the block occupancy rates are based on the respective quantities of blocks having the corresponding total color number counts divided by a total number of blocks in the image.

3. The method of claim 1, including:
    determining local features based on the total color number counts; and
    converting the local features to global features.

4. The method of claim 1, including:
    extracting local features based on the total color number counts;
    converting the local features to global features; and
    classifying the image according to the block occupancy rates and the global features.

5. The method of claim 1, wherein a first classifier in the plurality of classifiers is to classify content of the image as text content or non-text content.

6. The method of claim 1, including, after a first classifier in the plurality of classifiers classifies content of the image as non-text content, computing a block cumulative occupancy rate, a second classifier in the plurality of classifiers to classify the content of the image based on the block cumulative occupancy rate, the block cumulative occupancy rate based on a sum of the block occupancy rates for a sequence of the total color number counts.

7. The method of claim 5, wherein a second classifier in the plurality of classifiers is to classify the content of the image as gaming content or natural content based on a cumulative distribution function.

8. The method of claim 1, wherein a distinct color number is represented by a hexadecimal triplet that specifies a color.

9. The method of claim 1, including dividing the image into a plurality of blocks.

10. An apparatus for image content classification, the apparatus comprising:
    at least one memory;
    computer readable instructions; and
    at least one processor circuit to be programmed based on the computer readable instructions to at least:
        count distinct color numbers in blocks of an image to determine respective total color number counts associated with corresponding ones of the blocks;
        determine respective block occupancy rates for corresponding ones of the total color number counts, the respective block occupancy rates based on respective quantities of the blocks of the image having the corresponding total color number counts; and
        implement a plurality of classifiers communicatively to classify the image according to the block occupancy rates.

11. The apparatus of claim 10, wherein the block occupancy rates are based on the respective quantities of the blocks having the corresponding total color number counts divided by a total number of blocks in the image.

12. The apparatus of claim 10, wherein one or more of the at least one processor circuit is to:
    determine local features based on the total color number counts; and
    convert the local features to global features.

13. The apparatus of claim 10, wherein one or more of the at least one processor circuit is to:
    extract local features based on the total color number counts;
    convert the local features to global features; and
    classify the image according to the block occupancy rates and the global features.

14. The apparatus of claim 10, wherein a first classifier in the plurality of classifiers is to classify content of the image as text content or non-text content.

15. The apparatus of claim 10, wherein, after a first classifier in the plurality of classifiers classifies content of the image as non-text content, one or more of the at least one processor circuit is to compute a block cumulative occupancy rate, second classifier in the plurality of classifiers to classify the content of the image based on the block cumulative occupancy rate, the block cumulative occupancy rate based on a sum of the block occupancy rates for a sequence of the total color number counts.

16. The apparatus of claim 14, wherein a second classifier in the plurality of classifiers is to classify the content of the image as gaming content or natural content based on a cumulative distribution function.

17. The apparatus of claim 10, wherein a distinct color number is represented by a hexadecimal triplet that specifies a color.

18. The apparatus of claim 10, wherein one or more of the at least one processor circuit is to divide the image into a plurality of blocks.

19. At least one memory or storage device comprising instructions to cause a computing device to at least:
    count distinct color numbers in blocks of an image to determine respective total color number counts associated with corresponding ones of the blocks;
    determine respective block occupancy rates for corresponding ones of the total color number counts, the respective block occupancy rates based on respective quantities of the blocks of the image having the corresponding total color number counts; and classify the image according to the block occupancy rates via a plurality of classifiers.

20. The at least one memory or storage device of claim 19, wherein the block occupancy rates are based on the respective quantities of the blocks having the corresponding total color number counts divided by a total number of blocks in the image.

21. The at least one memory or storage device of claim 19, wherein the instructions are to cause one or more of the computing device to:

determine local features based on the total color number counts; and convert the local features to global features.

22. The at least one memory or storage device of claim 19, wherein the instructions are to cause the computing device to:

extract local features based on the total color number counts;

convert the local features to global features; and classify the image according to the block occupancy rates and the global features.

23. The at least one memory or storage device of claim 19, wherein a first classifier in the plurality of classifiers is to classify content of the image as text content or non-text content.

24. The at least one memory or storage device of claim 19, wherein the instructions are to cause the computing device to, after a first classifier in the plurality of classifiers classifies content of the image as non-text content, compute a block cumulative occupancy rate, a second classifier in the plurality of classifiers to classify the content of the image based on the block cumulative occupancy rate, the block cumulative occupancy rate based on a sum of the block occupancy rates for a sequence of the total color number counts.

25. The at least one memory or storage device of claim 23, wherein a second classifier in the plurality of classifiers is to classify the content of the image as gaming content or natural content based on a cumulative distribution function.

* * * * *